United States Patent
McClure et al.

(10) Patent No.: US 7,658,145 B1
(45) Date of Patent: Feb. 9, 2010

(54) FAST TIE QUAD TWINE WRAPPING MECHANISM

(75) Inventors: John R. McClure, New Holland, PA (US); David M. DeChristopher, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/271,105

(22) Filed: Nov. 14, 2008

(51) Int. Cl.
*B65B 13/02* (2006.01)
*B65B 13/18* (2006.01)

(52) U.S. Cl. .................. 100/2; 100/5; 100/13; 100/88; 56/341

(58) Field of Classification Search ............ 100/2, 100/5, 6, 13, 87, 88; 56/341, 343
See application file for complete search history.

(56) References Cited

U.S. PATENT DOCUMENTS

| | | |
|---|---|---|
| 2,971,455 A | 2/1961 | Wade et al. |
| 4,446,783 A | 5/1984 | Illy |
| 4,649,812 A | 3/1987 | Mouret |
| 4,793,249 A | 12/1988 | Wellman |
| 5,072,667 A | 12/1991 | Yeardley |
| 5,170,701 A | 12/1992 | Viaud |
| 5,465,658 A * | 11/1995 | Wagstaff et al. ............... 100/5 |
| 5,816,038 A * | 10/1998 | Anderson et al. ............ 56/341 |
| 5,855,167 A | 1/1999 | Goossen et al. |
| 6,769,353 B1 | 8/2004 | Smith et al. |
| 7,104,189 B2 | 9/2006 | Bandstra |
| 7,270,053 B2 | 9/2007 | Paillet et al. |

FOREIGN PATENT DOCUMENTS

DE    0019742003 A1    4/1999

* cited by examiner

*Primary Examiner*—Jimmy T Nguyen
(74) *Attorney, Agent, or Firm*—Patrick M. Sheldrake; John William Stader; Michael G. Harms

(57) ABSTRACT

A simplified mechanism for feeding a plurality of individual twine strands into a bale forming chamber for wrapping a bale that allows user-selectable adjustment of twine strand spacing along the bale length so that an optimal number of circumferential twine wraps around the bale necessary to secure the bale after discharge from the bale forming chamber may be selected. The simplified thus enables the spacing between twine strands to be optimized for various crop materials that are being baled.

14 Claims, 5 Drawing Sheets

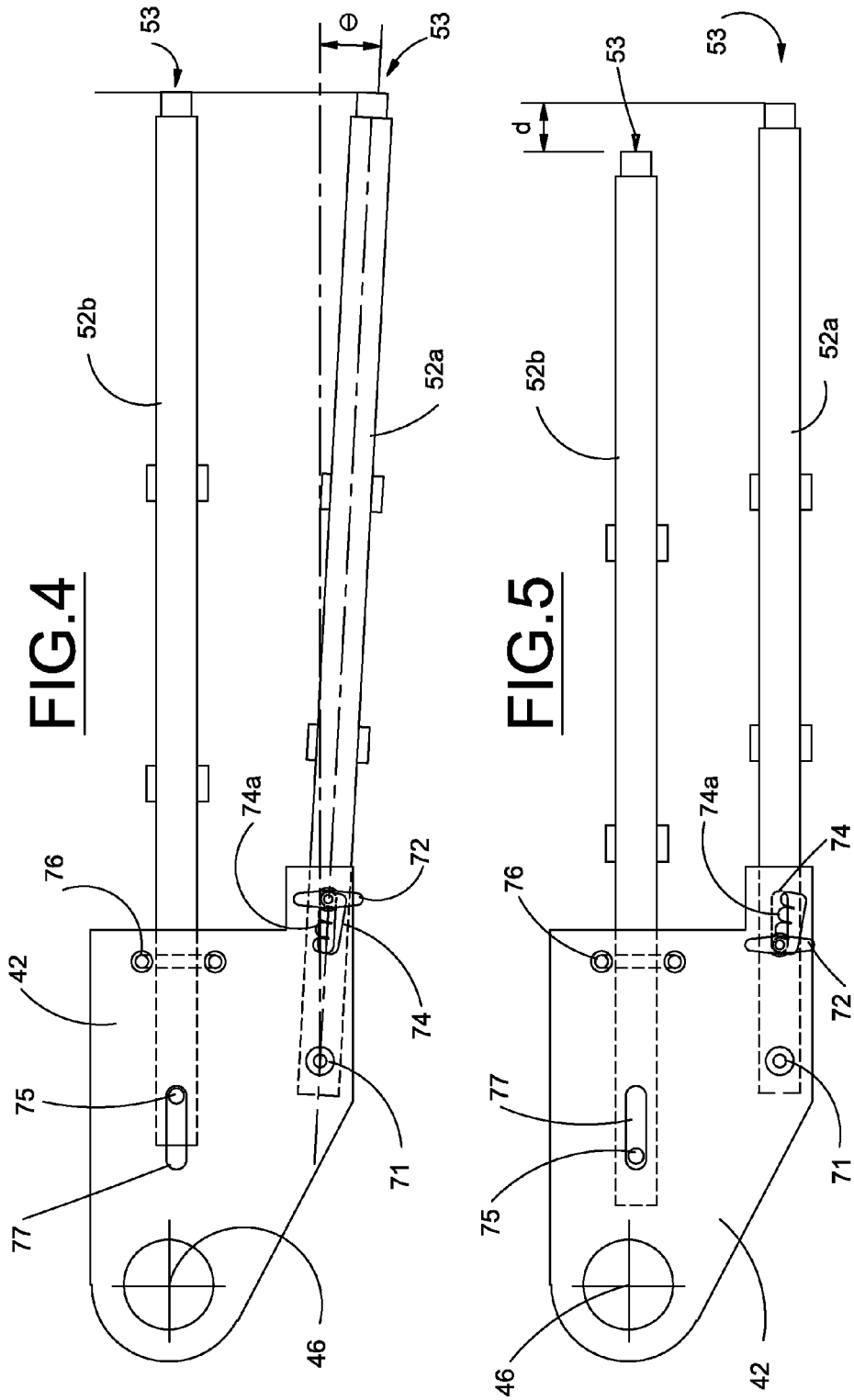

FAST TIE QUAD TWINE WRAPPING MECHANISM

BACKGROUND OF THE INVENTION

The present invention relates generally to agricultural round balers for forming round bales of cut crop material and twine wrapping systems that automatically wrap the formed bales with twine before expelling them onto a field for subsequent handling. More particularly, the invention relates to an improved twine wrapping mechanism that dispenses multiple twine strands and allows selective twine spacing adjustment in order to reduce the time required complete the twine wrapping operation.

Typical round balers (also referred to simply as a "baler"), such as disclosed in U.S. Pat. No. 6,209,450 to Naaktgeboren et al., are agricultural machines that pick up a cut crop material from the ground and form it into a compacted round bale in a bale forming chamber. When the bale has been sufficiently compacted to a desired density or a desired size depending on the baler construction, bale density or bale size sensors, as appropriate, send signals to a controller that subsequently sends a signal to an operator's panel to stop forward motion of the baler so that a bale wrapping operation can be performed, wherein the formed bale is wrapped with netting or twine to produce a completed wrapped bale.

Typically, the wrapping operation is performed by a bale wrapping mechanism having a twine wrapping arm which traverses the length of the rotating bale while dispensing one or more strands of twine. When a wrap cycle is initiated, the arm is moved arcuately to an extended or insert position with an end of the twine strand dangles from the end of the twine arm sufficiently close to the rotating bale so that the end of the twine strand is adjacent to the bale. Subsequently, the dangling strand is caught by the cut crop material of the rotating bale as it rotates in the bale forming chamber so that the twine is pulled into the bale forming chamber and wrapped around the bale. As twine is pulled from the twine arm and wraps about the rotating bale, the arm is rotated so that the arm end from which the twine is dispensed traverses an arcuate path and dispenses twine along the length of the bale so that twine is helically wrapped around the bale along substantially its entire length. At the end of a wrap cycle, one or more wraps secure the twine end to the bale. Before the completed wrapped bale is expelled from the baler, the twine strand is cut, the baler tailgate opens and the completed wrapped bale is then expelled from the baler to the ground.

In order to reduce the time necessary to complete the wrapping operation, it is known to provide a bale wrapping apparatus having a twine arm mechanism for simultaneously dispensing two twine strands along spaced-apart paths. Due to the typically arcuate path of the twine arm, the spacing between the twine strands will vary as the arm sweeps through its movement path, generally resulting in closer twine spacing (a greater number of twine wraps around the bale) than is desired as the twine arm approaches a position generally parallel to the bale length. Furthermore, it may be desirable to alter the twine spacing for different crop materials. Variations in the rate at which the twine arm sweeps through its arcuate path or the rate of bale rotation result in non-uniform twine spacing along the bale as the separation between the two strands being dispensed does not vary. These conditions comprise the efficiency with which the bale can be wrapped.

In an effort to overcome these limitations, assignee's U.S. Pat. No. 6,769,353 to Smith et al., discloses an improved twine wrapping apparatus comprising four twine tubes on two twine dispensing arms to facilitate the rapid wrapping of a formed bale. Each twine dispensing arms comprises a pair of parallel links terminating in a cam member that is necessary to maintain the twine tubes evenly spaced apart and directing twine perpendicular to the bale axis throughout movement of the dispensing arm. The physical size of this mechanism results in increases debris accumulation on the mechanism; its complexity generally increases production costs.

It would be desirable to provide a simplified mechanism for feeding four individual twine strands into a bale chamber for wrapping a bale that provides comparable bale wrapping results, enables user adjustment to optimize twine spacing (number of wraps on a bale) for various crop materials, minimizes debris accumulation on the mechanism, and reduces the time required to perform the wrapping operation. Still more desirable would be a twine feeding mechanism that is easily incorporated into existing round baler designs with minimal alteration of the bale forming and wrapping mechanisms.

SUMMARY OF THE INVENTION

Accordingly, the present invention, in any of the embodiments described herein, may provide one or more of the following advantages:

It is an object of the present invention to provide a simplified mechanism for managing the position of a plurality of individual twine feeding tubes so that twine strands may be efficiently directed into a bale forming chamber at pre-determined desired locations in order to wrap a completed bale prior to ejection from the baler.

It is a further object of the present invention to provide a simplified twine feeding mechanism for a baler that is more economical to produce that assignee's known four twine bale wrapper yet still capable of providing the desired twine wrapping performance.

It is a further object of the present invention to replace a two arm/four twine tube twine wrapping mechanism having a parallelogram linkage from assignee's known prior art a mechanism having two pairs of individual twine tubes, each pair being rotatable to direct twine along the length of a bale in the bale forming chamber to direct twine strands into the bale forming chamber at pre-determined desired locations.

It is a further object of the present invention to provide a simplified twine feeding mechanism capable of evenly spacing multiple twine strands along the length of the bale during the wrapping process.

It is a further object of the present invention to provide an improved twine wrapping mechanism for a round baler that dispenses multiple twine strands into a bale forming chamber and enables user-adjustable twine spacing to allow a desired number of twine wraps to be pre-selected.

It is a still further object of the present invention to provide an improved mechanism for dispensing multiple twine strands into a bale forming chamber that is more compact than known mechanisms in order to reduce the accumulation of crop debris on the mechanism.

It is a still further object of the present invention to provide an improved four twine dispensing mechanism for wrapping a bale in a round baler that is durable in construction, inexpensive of manufacture, carefree of maintenance, easily assembled, and simple and effective to use.

These and other objects are achieved according to the instant invention by providing a simplified mechanism for feeding a plurality of individual twine strands into a bale forming chamber for wrapping a bale that allows user-selectable adjustment of twine strand spacing along the bale length so that an optimal number of circumferential twine wraps around the bale necessary to secure the bale after discharge from the bale forming chamber may be selected. The simplified thus enables the spacing between twine strands to be optimized for various crop materials that are being baled.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 is a partial plan view of a single twine arm from one embodiment of the present invention showing an adjustable twine tube in a first position for optimizing twine spacing on the bale;

FIG. 5 is a partial plan view of a single twine arm from one embodiment of the present invention showing the adjustable twine tube in a second position for optimizing twine spacing on the bale.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
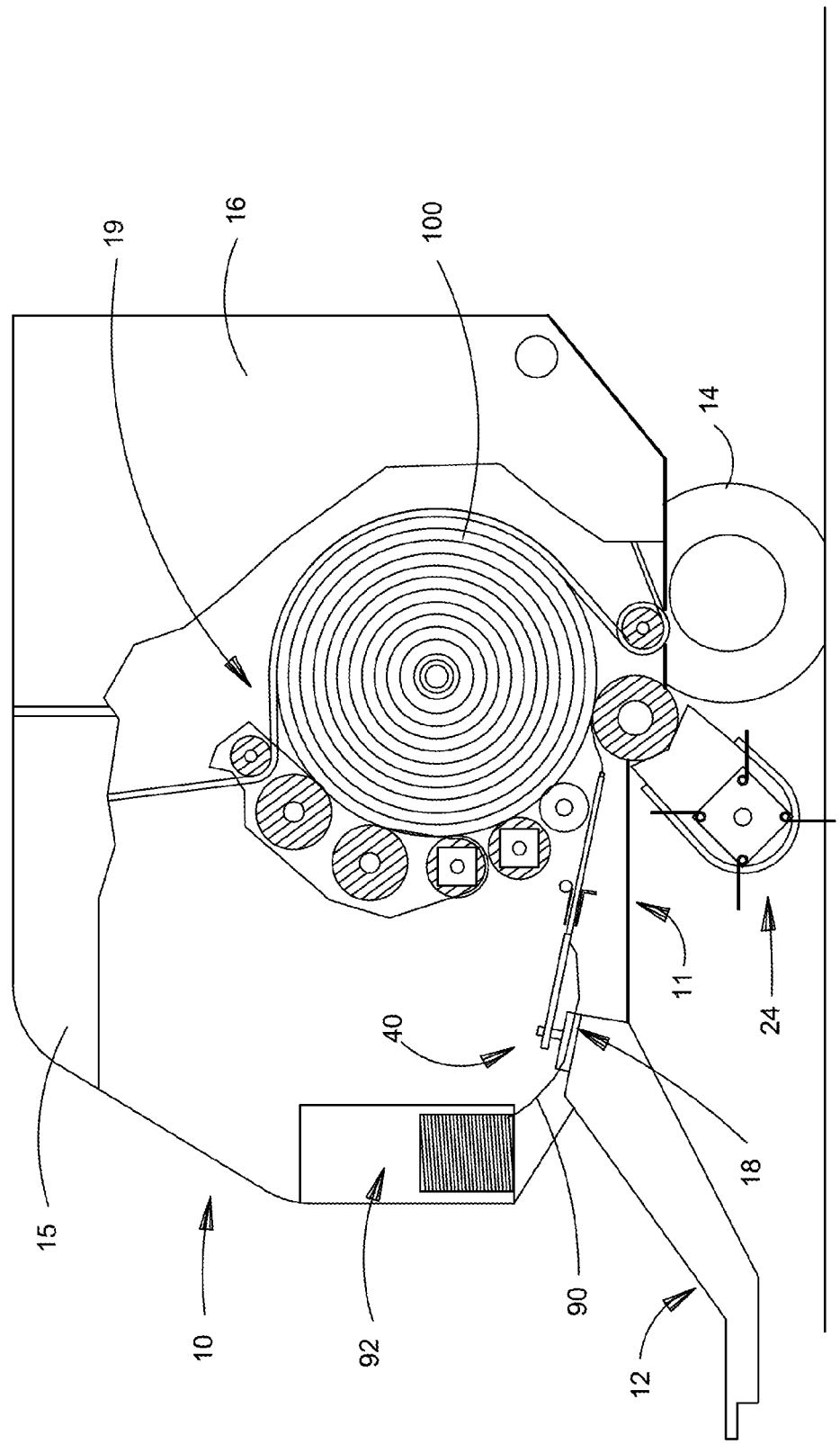
FIG. 1 is a side elevation view of a round baler of the type on which the present invention is useful.

Referring to FIG. 1, a generally well-known round baler 10, having a main frame 11 terminating forwardly in a tongue 12 and rearwardly slightly beyond a transverse axle to which a pair of wheels 14 (only one shown) are mounted-thus forming a wheel-supported housing 15. The housing 15 encloses an expandable bale-forming chamber 19, typically defined by a series of movable belts, rolls, and a pair of generally parallel and opposing sidewalls of the housing. Other combinations of belts, rollers, and/or pulleys are also known as methods for defining the bale forming chamber and are contemplated within the scope of this invention. Cut crop material is picked up by transverse pickup 24 and fed into bale-forming chamber where it is formed into a cylindrically shaped bale 100 by movement of the belts and rolls. A completed bale, that is one that has reached a desired diameter or density, is then wrapped with twine or a wrapping material dispensed from the wrapping mechanism 40, to maintain the bale shape after ejection from the baler. The wrapping apparatus 40 is positioned generally forwardly in the baler housing. Upon completion of the wrapping process, a tailgate 16 at the rear of the housing 15 pivots upwardly to open the rearward portion of the bale forming chamber and the bale is ejected onto the ground. Exemplary prior art balers and wrapping apparatus are shown in U.S. Pat. Nos. 4,956,968, 5,289,672, and 6,021,622, all by Underhill, the descriptive portions of which are incorporated herein by reference.

Figure 2:
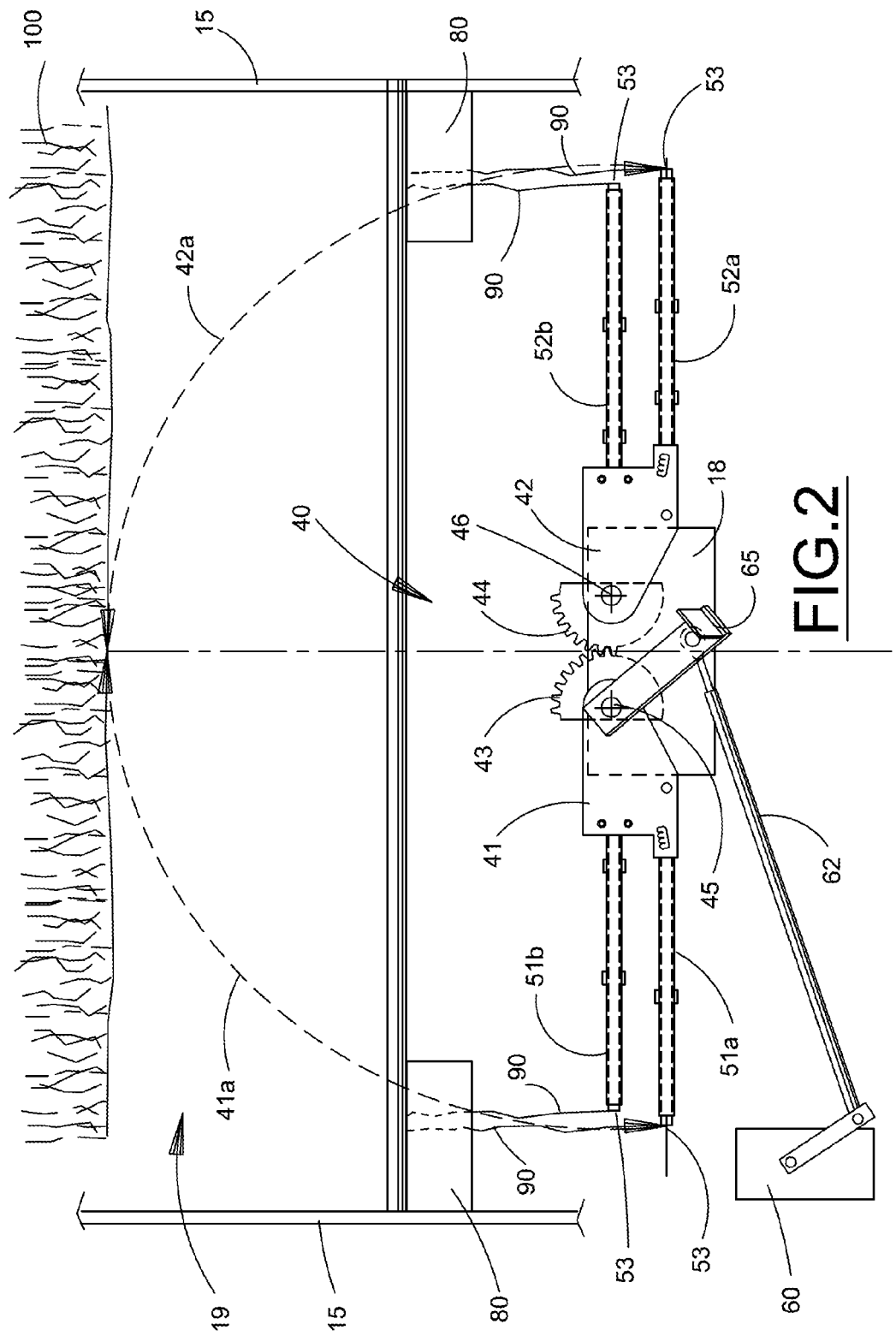
FIG. 2 is a partial plan view of the agricultural round baler of FIG. 1 showing one embodiment of the present invention in which the twine arms are in a first (home) position.
Figure 3:
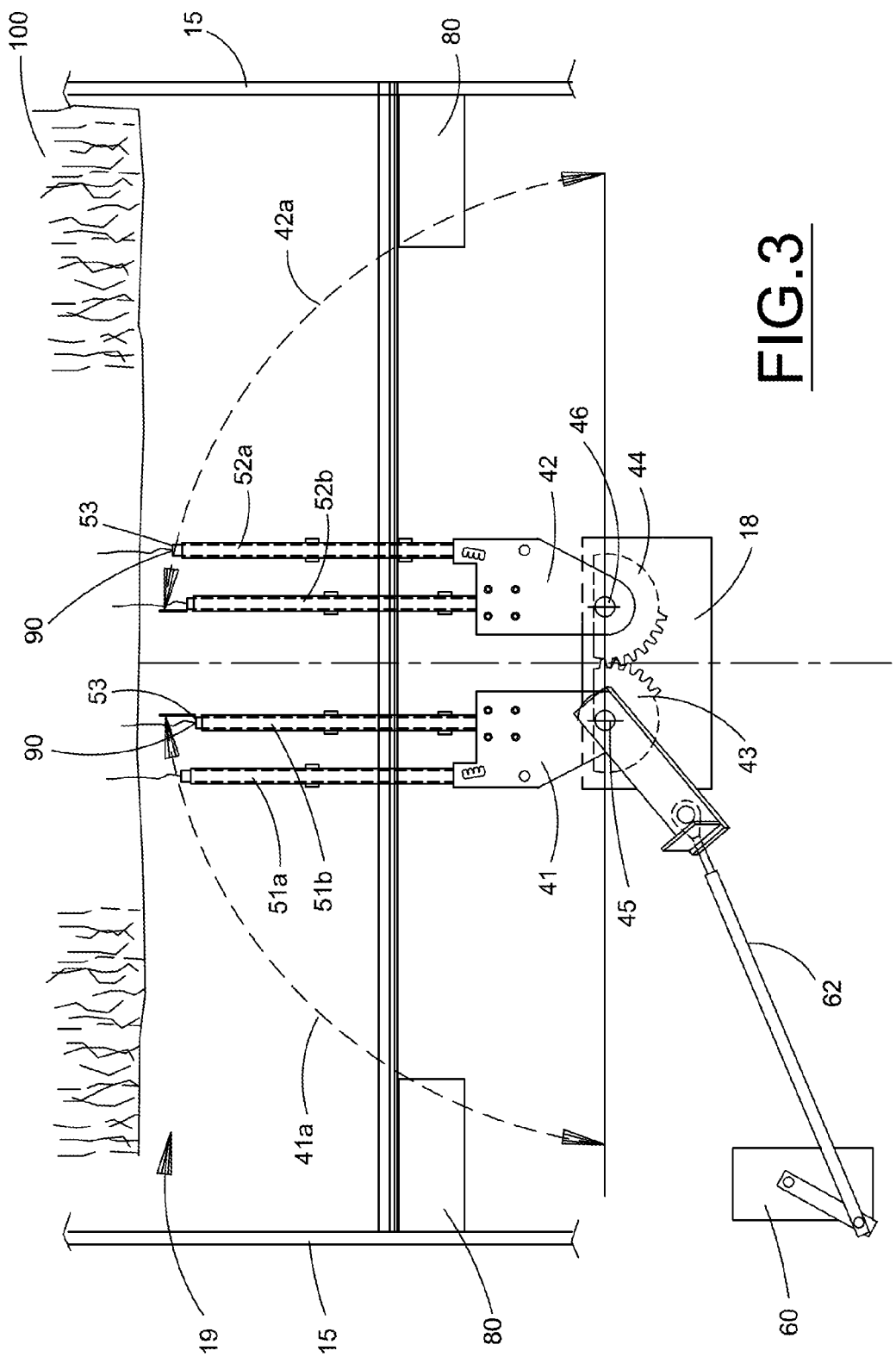
FIG. 3 is a partial plan view of the agricultural round baler of FIG. 1 showing one embodiment of the present invention in which the twine arms are in a second (insert) position.

Now referring to FIGS. 2 and 3 in conjunction with FIG. 1, the wrapping apparatus 40 is shown to more particularly comprise a pair of pivotally mounted twine dispensing arm supports 41, 42, each supporting a pair of elongate twine dispensing arms 51a, 51b and 52a, 52b, respectively for dispensing a plurality of twine strands 90 from a twine dispenser 92 into the bale forming chamber 19. Twine dispensing arm support mechanisms 41, 42 are pivotally connected to a base mount 18 by pivot connections 45, 46. Base mount 18 is structurally supported by the baler housing 15 and main frame 11 to positionally fix the wrapping apparatus with respect to the baler housing. The pivotal connection (pivot connections 45, 46) enables the distal ends 53 of each pair of twine dispensing arms to move through respective arcs, illustrated as arcs 41a and 42a, corresponding to the movement of twine dispensing arm support mechanisms 41, 42, respectively. Twine dispensing arm support mechanisms 41, 42 each have a synchronizing gear 43, 44, which intermesh in manner to cause the support mechanisms to pivot in opposite directions relative to one another so that movement of a first twine dispensing arm support mechanism 41 is mirrored by movement of the second twine dispensing arm support mechanism 42. One skilled in the art will recognize that the present invention is also useful in a wrapping mechanism having only a single twine arm support mechanism for pivoting a plurality of twine dispensing arms. Further, a variety of alternative means may be used to coordinate the counter-rotating movement of the twine dispensing support mechanisms in wrapping apparatus employing multiple twine arm support mechanisms and remain within the scope and spirit of this invention.

Movement of the twine dispensing arm support mechanisms 41, 42 is managed by an actuator 60 which connects via tie rod 62 to a link arm 65 which is connected to one of the twine dispensing arm support mechanisms (first twine dispensing arm support mechanism 41 as presented in FIGS. 2 and 3) in a manner to pivot with the twine dispensing arm support mechanism between generally opposing initial and terminal positions. Operation of actuator 60 may be manually or automatically controlled depending upon the degree of automation present in the baler. Movement of the wrapping apparatus in response to actuator 60 is discussed in detail below.

As can be seen in FIGS. 2 and 3, each pair of twine dispensing arms extend away from their respective twine dispensing arm support mechanisms and terminate in respective distal ends 53. Each twine dispensing arm 51a, 51b, 52a, 52b includes a guide for directing twine from the dispenser to each distal end 53 of the twine dispensing arm for application to the outer surface of a completed bale. In one embodiment, each twine dispensing arm comprises a hollow, tube-like structure having a twine strand directed therethrough to accomplish the guide function. When the twine arm support mechanisms are moved to the insert position, the twine is engaged by the outer surface of the rotating bale and drawn around the bale as it rotates. Rotational position of the twine dispensing arms determines the position along the bale length at which the twine is deposited. Thus, counter-rotational movement of the twine dispensing arm support mechanisms 41, 42 at a rate controlled by actuator 60 in conjunction with rotation of the bale causes twine to be helically wrapped around the bale along its length, commencing near the central portion of the bale and continuing toward each end.

FIG. 2 shows wrapping apparatus in a first position, also referred to as the home or terminal position, corresponding normal baler operation and the twine dispensing arm position at the completion of a bale wrapping cycle. In this position, the twine dispensing arm supports 41, 42 are rotated so that the twine dispensing arms extend from the centrally positioned base mount outwardly toward the baler side walls. The ends of twine strands 90 extend from the ends of the twine dispensing arms and may be held in position by clamping action of the knife mechanism 80.

FIG. 3 shows the twine dispensing arms 51a, 51b and 52a, 52b in a second position. In this position, also referred to as the insert or wrap initiation position, the distal ends 53 of the twine dispensing arms are rotated toward the central portion of the bale. Movement of the wrapping apparatus to this position may be initiated manually by an operator via an operator input apparatus, such as a push button or switch, or automatically by a controller which monitors the baling process. Because of the arc-like paths 41a, 42a of the distal ends 53, the ends 53 are positioned much closer to the outer periphery of the bale than when the twine dispensing arms are in the home position (shown in FIG. 2). The free ends of the twine strands 90 are engaged by the surface of the rotating bale, drawn into the bale forming chamber, and wrapped around the bale by the rotation of the bale. In conjunction with bale rotation, the twine dispensing arm support mechanisms 41, 42 are also slowly pivoted to sweep the distal ends 53 along the length of the bale (from the central position shown in FIG. 2 toward the outward position shown in FIG. 3) while feeding twine from the dispenser 92 into the bale forming chamber thereby causing the twine to be wrapped in a helical pattern along the bale length. Because the two twine dispensing arm support mechanisms are centrally positioned and each sweeps the distal ends from the central portion to a respective end, multiple helical twines are wrapped around the bale. A wrapping apparatus using only a single twine arm support mechanism would generally sweep the distal ends along the entire bale length. As the twine dispensing arms reach the home position corresponding to a completely wrapped bale, knife mechanism 80 cuts the twines so that the bale may be discharged from the bale forming chamber.

The time required to wrap the bale largely depends on the rotational speed of the bale in the bale-forming chamber, the number of twine strands simultaneously dispensed, and the ability of the twine wrapping apparatus to optimally place each individual twine strand on the bale surface. Twine spacing lengthwise along the bale, must be sufficiently close for proper wrapping. Twine spacing is also commonly reported as a number of wraps around the bale.

As can be seen from FIGS. 2 and 3, one embodiment of the present invention decreases bale wrapping time by simultaneously supplying four individual twine strands to wrap the bale. Further bale wrapping efficiency is obtained by separating the individual twine dispensing arms slightly so that pairs of twines emanating from each twine dispensing arm support mechanism 41, 42, respectively, engage the bale at different locations optimally spaced apart along the bale length to allow the bale to be effectively secured with a minimal number of twine wraps. The separation between the individual twine dispensing arms in each pair is determined by balancing the desired twine spacing/number of wraps for the crop material being baled and the variations in spacing that occur as a result of the arc movement of the twine dispensing arms. Spacing that is optimized near the central portion of the bale (when the twine dispensing arms are generally perpendicular to the bale) will grow increasingly closer as the twine dispensing arms are pivoted toward the ends of the bale. Twine spacing that is optimized near the ends of the bale, may not be sufficiently close in the central portion of the bale. Furthermore, twine dispensing arm spacing that is optimized for one crop material might not be suitable for wrapping a different crop material.

Figure 6:
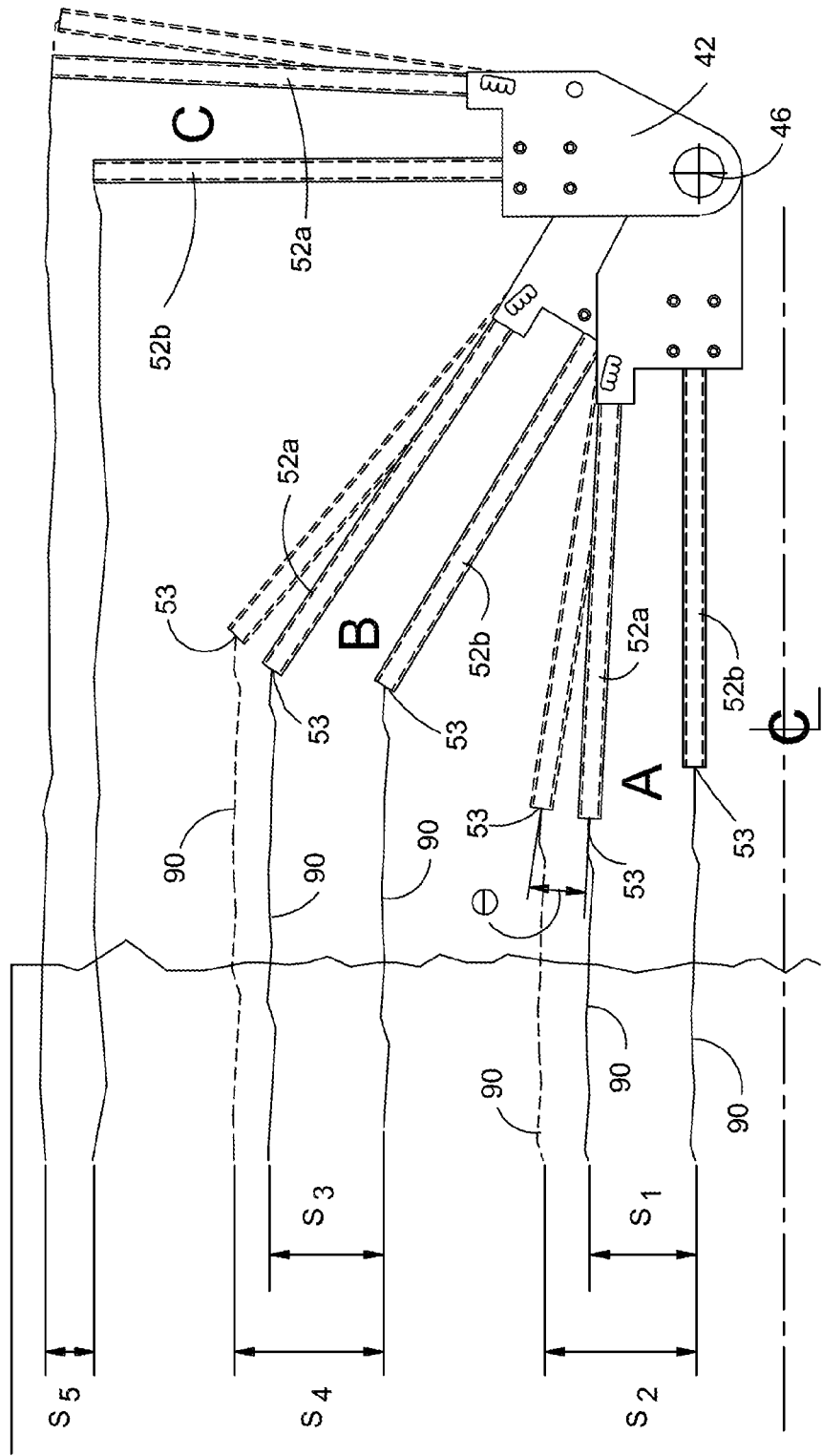
FIG. 6 is a partial plan view of a single twin arm showing the relationship of a plurality of user-adjustable twine arm positions.

Now referring to FIGS. 4 through 6, wherein one embodiment of the present invention is presented to provide a user-adjustable twine dispensing arm spacing mechanism that allows twine spacing along the length of the bale to be selectively altered and optimized for the desired number of twine wraps around a bale of a specific crop material. The figures presented and the following discussion are directed toward twine dispensing arm support mechanism 42; it is understood that the wrapping apparatus 40 comprises a pair of twine dispensing arm support mechanisms that mirror each other and that the below discussion may be applied to either twine dispensing arm support mechanism.

Twine dispensing arm support mechanism 42 provides movable connections for first and second twine dispensing arms 52a, 52b, respectively, that enable the twine spacing for wrapping a bale to be optimized and thus the time required for wrapping to be minimized. First twine dispensing arm 52a includes a pivotal connection comprising a pivot connection 71, and angle guide 74, and an angle guide fixing device 72. Angle guide fixing device 72 is movable axially along the length of the first twine dispensing arm 52a which allows it to be variably positioned within the angle guide 74. A plurality of detents 74a allows a series of pre-determined positions to be defined in the angle guide. Indicia can be incorporated to indicate twine strand spacing or the number of twine wraps corresponding to each position for ease of operator adjustment. The alignment of angle guide 74 on the twine dispensing arm support allows first twine dispensing arm 52a to be angled, shown as $\Theta$ in FIG. 4, with respect to second twine dispensing arm 52b by positioning the guide fixing device 72 in one of the detents 74a, thereby altering the spacing between the distal ends 53 of the twine dispensing arms. Practical limits on the angular relation range from a configuration in which first and second twine dispensing arms 52a, 52b converge so that the distal ends 53 are closely spaced (near touching) up to a position angle $\Theta$ of approximately 20 degrees. While larger position angles are possible, the effect on twine spacing obfuscates the benefit of multiple twine strand feeds. The effect of the angular position $\Theta$ of first twine dispensing arm 52a on twine spacing is more significant when the twine arms are positioned near the central portion of the bale. As the twine dispensing arms are pivoted away from the central portion, the effect of angular position $\Theta$ of first twine dispensing arm 52a on twine spacing is less significant.

To this end, second twine dispensing arm 52b includes an axially adjustable connection to twine dispensing arm support 42 that enables the extension distance of the distal end 53 to be selectively altered, thereby altering the separation distance "d" between the ends of first and second twine dispensing arms and enabling twine strand spacing adjustment as the arm support mechanism mechanisms approach the terminal position. In one embodiment, the second adjustment mechanism includes an axial guide structure 77 with a first axial fixing device 75 and a second axial fixing device 76. Alternatively, a pair of axial fixing devices 76, such as conventional U-bolts, may be used to non-pivotably secure twine arm 52b to the twine arm support mechanism 42. Changes in the distal end position of second twine dispensing arm 52b affect twine spacing on the bale as the twine dispensing arms approach the home position (shown in FIG. 3) where the angular position of first twine dispensing arm 52a has less influence on twine spacing on the bale. By altering the position of both first twine dispensing arm 52a and second twine dispensing arm 52b, the twine spacing along the length of the bale to be wrapped can be optimally maintained.

FIG. 6 illustrates variations in twine spacing along the bale length for multiple twine dispensing arm support positions. Twine spacing may be altered by adjusting the angular position of first twine dispensing arm 52a, shown as angle $\Theta$.

When the twine dispensing arm support mechanism 42 is in the wrap initiation position (position A), the effect is to vary the twine spacing within the range shown between $S_1$ and $S_2$. As the arm support mechanism 43 is pivoted to position B, the effect of the spacing is diminished, shown as ranging between $S_3$ and $S_4$, until the support arm reaches the terminal position (position C). Adjustment of twine spacing in the terminal position is enhanced by second twine arm 52b adjustment mechanism which allows the axial extension of second twine arm 52b to be selectively altered, thereby allowing a range of twine spacing adjustment shown within the range shown as $S_5$. By optimally positioning twines along the bale for the particular crop material to be wrapped, the minimum bale rotations to complete the wrapping process can be achieved which translates into less time required to complete the wrapping process.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An apparatus for delivering a plurality of strands of a bale wrapping material into a bale forming chamber of an agricultural baler and controlling strand placement on the bale, the apparatus comprising:

a first dispensing arm support mechanism pivotally connected to the baler at a first pivot point;

an actuator for selectively pivoting said first dispensing arm support mechanism between generally opposing initial and terminal positions;

an elongate first dispensing arm pivotally connected at one end to said first dispensing arm support mechanism and extending outwardly away from said first dispensing arm support mechanism and terminating in a first arm end, said first dispensing arm for dispensing a first strand;

an elongate second dispensing arm slidably connected at one end to said first dispensing arm support mechanism and extending outwardly away from said first dispensing arm support mechanism and terminating in a second arm end, said second dispensing arm for dispensing a second strand, a radial extension of said second dispensing arm from said first dispensing arm support mechanism is selectively adjusted with respect to a radial extension of the first dispensing arm to allow the second arm end offset from the first arm end; and a first adjustment mechanism for connecting said first dispensing arm to said first said dispensing arm support mechanism, said first adjustment mechanism allowing said first dispensing arm to be selectively angled with respect to said second dispensing arm whereby spacing between said first and second arm ends may be angularly altered to control the spacing between said first strand and said second strand dispensed on the bale.

2. The apparatus of claim 1, further comprising a second adjustment mechanism for connecting said second dispensing arm to said first dispensing arm support mechanism, said second adjustment mechanism allowing the radial extension of said second dispensing arm to be selectively adjusted with respect to said first dispensing arm radial extension, whereby spacing between said first and second arm ends may be altered to control the spacing between said first strand and said second strand on the bale.

3. The apparatus of claim 2, wherein movement of said first dispensing arm support mechanism between said initial position and said terminal position causes movement of said first and second arm ends though an arc of less than approximately 110 degrees.

4. The apparatus of claim 3, wherein said first and second arm ends are positioned generally adjacent to the middle of the bale length when said dispensing arm support mechanisms are in said initial position.

5. The apparatus of claim 4, wherein said first adjustment mechanism comprises a guide structure disposed on said first dispensing arm support mechanism and a first fixing device moveably connected to said first dispensing arm, said guide structure having a plurality of detents for receiving said first fixing device, each of said plurality of detents corresponding to a unique angle between said first and second dispensing arms.

6. The apparatus of claim 5, further comprising a second dispensing arm support mechanism pivotally connected to the baler at a second pivot point adjacent to said first pivot point, movement of said second dispensing arm support mechanism coordinated for counter-rotating movement relative to said first dispensing arm support mechanism and having elongate first and second dispensing arms matching those connected to said first dispensing arm support mechanism.

7. A bale wrapping apparatus for an agricultural round baler, the baler having a frame for supporting a bale forming chamber defined by movable belts in contact with a plurality of rollers and/or pulleys disposed in a space between two opposing side walls, and a dispenser for storing a supply of wrapping material for application to a completed bale, the wrapping apparatus for directing the deposition of the wrapping material onto the bale and comprising:

first and second dispensing arm support mechanisms, each said dispensing arm support mechanism being pivotally connected to the frame, said first dispensing arm support mechanism and said second dispensing arm support mechanism being coordinated for respective counter-rotating movement between an initial position and a terminal position;

an actuator for selectively moving said first and second dispensing arm support mechanisms between said initial position and said terminal position;

each said arm support mechanism further comprising:

an elongate first dispensing arm slidably connected at one end to a respective said dispensing arm support mechanism for pivotal movement therewith, and a distally opposed first arm end for dispensing a strand of the wrapping material into the bale forming chamber, said first dispensing arm is linearly adjustable with respect to a respective said dispensing arm support mechanism to selectively alter a linear extension of said first dispensing arm from the respective said dispensing arm support mechanism; and an elongate second dispensing arm for directing an additional strand of the wrapping material into the bale forming chamber, said second dispensing arm pivotally connected at one end to a respective said dispensing arm support mechanism for pivotal movement therewith, and extending outwardly and terminating in a second arm end, said second dispensing arm being connected to the respective said dispensing arm support mechanism in a manner allowing said second dispensing arm to be selectively angled between first and second limits with respect to said first dispensing arm, whereby spacing between said first and second arm ends may be angularly altered to control the spacing between said strand and said additional of wrapping material on the bale.

8. The apparatus of claim 7, further comprising a first arm adjustment mechanism for connecting said first dispensing arm to said dispensing arm support mechanism, said first arm adjustment mechanism allowing the extension of said first dispensing arm to be selectively altered with respect to the extension of said second dispensing arm, whereby spacing between said first and second arm ends may be altered to control the spacing between said strand and said additional strand on the bale.

9. The apparatus of claim 8, wherein movement of said first and second dispensing arm support mechanisms between said initial positions and said terminal positions causes movement of said first and second arm ends though an arc of less than approximately 110 degrees.

10. The apparatus of claim 9, wherein said first and second arm ends of each said dispensing arm support mechanism are positioned generally adjacent to the middle of the bale length when said arm support mechanisms are in said initial position.

11. The apparatus of claim 10, wherein said first and second arm ends of each said arm support mechanism are positioned generally adjacent to respective opposing sidewalls of the bale forming chamber when said arm support mechanisms are in said terminal position.

12. A method for selectively adjusting the spacing between strands of twine wrapped around a round bale being rotated in a bale forming chamber of an agricultural round baler comprising the steps:
providing a round baler having a forward end, an opposing rear end and opposing first and second sides, a bale-forming chamber defined by belts, a plurality of transverse rollers and/or pulleys and the opposing sides of the baler, and a tailgate for discharging a completed bale from the baler;
providing a first dispensing arm support mechanism pivotally connected to the baler for movement between an initial position and a terminal position;
providing an actuator for moving the first dispensing arm support mechanism between the initial and terminal positions;
providing an input apparatus for selectively initiating the wrapping operation by causing the actuator to move to the initial position;
providing for the dispensing arm support mechanism:
an elongate first dispensing arm slidably connected at one end to the dispensing arm support mechanism for pivotal movement therewith, the first dispensing arm extending outwardly away from the dispensing arm support mechanism terminating in a first arm end, the first dispensing arm for dispensing a first strand of the wrapping material into the bale forming chamber, said first dispensing arm is linearly adjusted with respect to said dispensing arm support mechanism to selectively alter a linear extension of said first dispensing arm from said dispensing arm support mechanism; and
an elongate second dispensing arm pivotally connected at one end to the dispensing arm support mechanism, the second dispensing arm extending outwardly away from the dispensing arm support mechanism terminating in a second arm end, the second connection end being connected to the arm support mechanism in a manner allowing the angular displacement of the second dispensing arm with respect to the first dispensing arm to be selectively adjusted between first and second limits, the second dispensing arm for directing a second strand of the wrapping material into the bale forming chamber;
providing a dispenser on the baler for supplying a plurality of twine strands to the first and second dispensing arms for direction into the bale forming chamber;
providing a knife apparatus for severing the plurality of twine strands from the dispenser following completion of the bale wrapping;
adjusting the angular position of the second dispensing arm to provide a desired spacing between the first and second strands of twine on the bale;
operating the baler to gather crop material to form a bale;
initiating the bale wrapping process using the input apparatus to cause the actuator to move the first support mechanisms toward the initial position;
wrapping the bale by rotation of the bale in the bale forming chamber while the actuator moves the first dispensing arm support mechanism from the initial position toward the terminal position while dispensing the strands of twine from the dispensing arms connected to said first dispensing arm support mechanism into the bale-forming chamber; and
severing the plurality of twine strands by the knife apparatus thereby terminating the wrapping process when the first dispensing arm support mechanism reaches the terminal position.

13. The method of claim 12, further comprising the steps of:
providing a first arm adjustment mechanism for connecting the first dispensing arm to the first dispensing arm support mechanism, the first arm adjustment mechanism allowing the linear extension of the first dispensing arm from the dispensing arm support mechanism to be selectively altered with respect to the linear extension of the second dispensing arm from the respective dispensing arm support mechanism; and
adjusting the linear extension of the first dispensing arm to provide a desired spacing between the first and second strands of twine on the bale.

14. The method of claim 13, further comprising the step of:
providing a second arm support mechanism pivotally connected to the baler at a second pivot point adjacent to the first pivot point, movement of the second arm support mechanism coordinated for counter-rotating movement relative to the first arm support mechanism; and
providing elongate first and second dispensing arms for the second arm support mechanism matching those connected to said first arm support mechanism.

* * * * *